Feb. 3, 1959  T. W. MOORE ET AL  2,872,605
HIGH SPEED ROTOR FOR DYNAMO ELECTRIC MACHINES
Filed Sept. 29, 1954  2 Sheets-Sheet 1
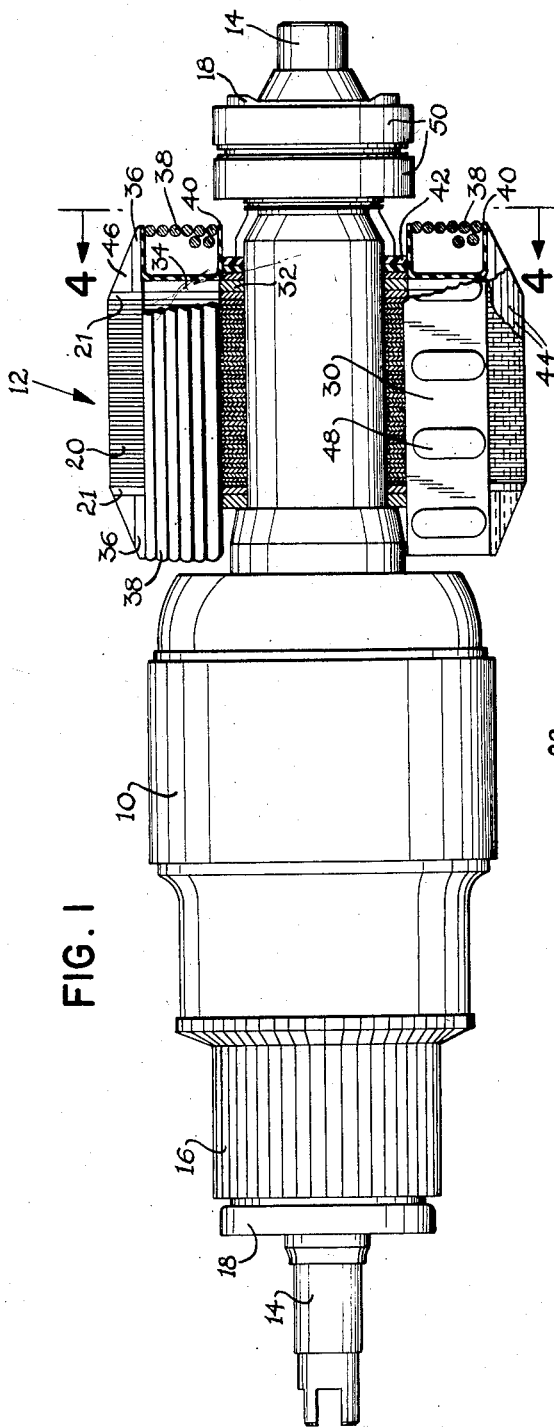
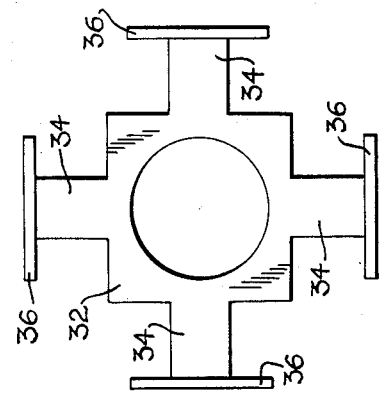
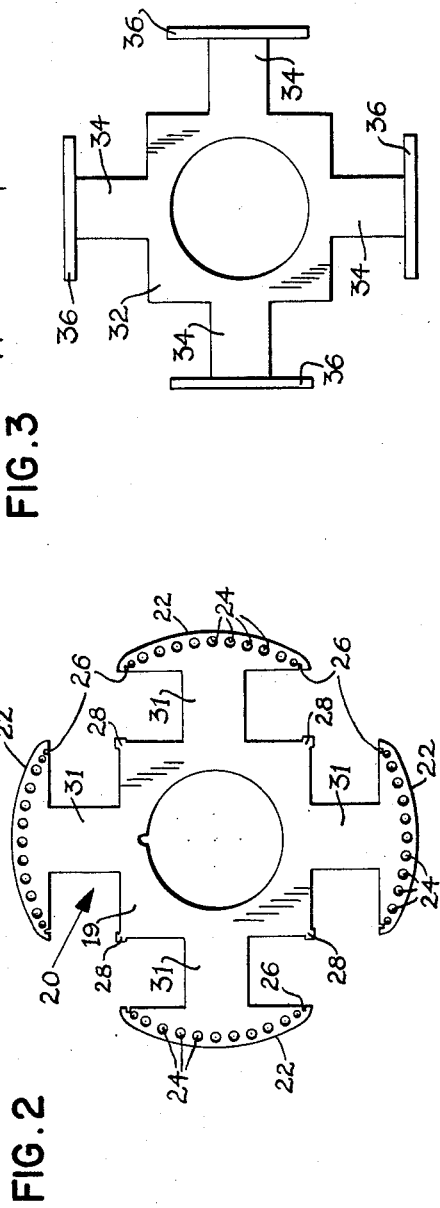
INVENTORS
THOMAS W. MOORE
WALTER S. WISEMAN
BY
Stewart F. Moore
ATTORNEY Feb. 3, 1959 T. W. MOORE ET AL 2,872,605
HIGH SPEED ROTOR FOR DYNAMO ELECTRIC MACHINES
Filed Sept. 29, 1954 2 Sheets-Sheet 2

INVENTORS
THOMAS W. MOORE
WALTER S. WISEMAN
BY
ATTORNEY

United States Patent Office 2,872,605
Patented Feb. 3, 1959

2,872,605

HIGH SPEED ROTOR FOR DYNAMO ELECTRIC MACHINES

Thomas W. Moore and Walter S. Wiseman, Dayton, Ohio, assignors to American Machine & Foundry Company, a corporation of New Jersey Application September 29, 1954, Serial No. 459,112

2 Claims. (Cl. 310—183)

This invention relates to dynamo electric machines and more particularly to the construction of rotors for such machines.

In dynamo electric machines intended for high speed operation, special structural problems arise because of high stresses resulting from centrifugal force which must be withstood at such speeds by the rotating components, particularly the rotor windings. Rotor coil movement and consequent mechanical unbalance is difficult to prevent in rotors for high speed inverters, especially in the type having a salient pole rotor construction for the A. C. section thereof. Such inverter rotors, to meet light weight, high frequency requirements, often rotate at speeds as high as 20,000 R. P. M., and accordingly generate centrifugal forces which tend to eject the windings from the outer portions of the salient poles.

Furthermore, amortisseur or short circuited dampening windings, normally laid in the outer pole faces of the AC portion of a single phase inverter rotor, create additional constructional problems as they are subjected to the maximum rotational forces developed by the rotor because of their outer position.

In accordance with a feature of the present invention, amortisseur windings in the form of conductive, lamination-supported pins, free of any movement during rotation, are employed to serve simultaneously as damping means and structural support members for the rotor field coils.

It is, therefore, an object of the invention to provide a light weight rotor for a dynamo electric machine having adequate strength to withstand the centrifugal forces effected thereon at high speeds.

It is a further object of the invention to provide a high speed rotor having amortisseur windings which simultaneously serve as an electrical damping device and a structural support for the rotor coil ends.

For a better understanding of the invention, together with other and further objects thereof, reference is made to the following detailed description taken in connection with the accompanying drawings, in which:

Fig. 1 is a side elevation, partly in section, of a rotor for a high speed inverter.

Fig. 2 is an end elevation of a single rotor lamination.

Fig. 3 is a detailed elevation of a coil retaining member.

Figure 4:
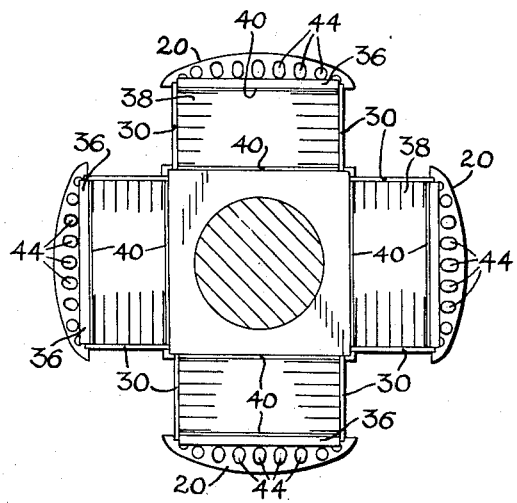
Fig. 4 is a sectional end elevation of the AC portion of the rotor taken on the line 4—4 of Fig. 1.

Referring to the drawings which disclose a preferred embodiment of the invention, the rotor as a whole is shown in Fig. 1. For illustrative purposes a rotor for an inverter is shown, but it is understood that the invention is applicable to any suitable high speed rotor if desired.

The inverter has separate D. C. and A. C. portions indicated generally as 10 and 12, respectively, mounted on a shaft 14. The D. C. section 10 has conventional armature windings, not shown, and the usual plurality of commutator bars 16 held to shaft 14 by a securing sleeve 18. The D. C. portion has been described only generally as the invention is directed primarily to the novel construction of the A. C. portion of the rotor.

The A. C. portion 12 has a plurality of magnetizable sheets or laminations 20, mounted in a stacked arrangement on shaft 14 and formed from any suitable material such as sheet iron, steel, or sintered iron powder. The lamination stack has abutting the ends thereof, identically shaped end members 21 which are slightly thicker than laminations 20 but, unlike magnetic laminations 20, should be formed from a highly conductive material, preferably copper. The configuration of the laminations 20 is shown in greater detail in Fig. 2. Each lamination is cruciform in shape and has a body portion 19 and a plurality of outwardly extending necks 31 terminating in heads 22 which, when stacked in register with the other laminations, form a plurality of pole pieces.

Near the outer edge of each head 22 are a number of holes 24. Each head also has slots 26 near its outer tip ends which are adapted to cooperate with the raised corners 28 of body portion 19 in order to position securely coil retainer plates 30.

Abutting the conducting laminations when in assembled relationship are coil retaining members 32, shown in detail in Fig. 3, which are also generally cruciform in configuration and have a plurality of arms 34 with laterally extending tab members 36 disposed on the outer ends thereof.

Each rotor coil 38 is wound about the neck portions 31 and arms 34 of laminations 20 and retaining member 32, respectively, and is generally held in place by conventional insulating members 40 and insulating washers 42. Tab 36 provides a shelf overlying coils 38 to prevent outward radial movement thereof due to the high centrifugal forces developed when the rotor is rotating at high speeds. Passing through each hole 24 of laminations 20 and conductive end plates 21 are a plurality of conducting bars 44 preferably formed of copper, and lying in parallel axial relationship to shaft 14 to aid in holding laminations 20 and 21 in alignment. The ends of bars 44 extend beyond conductive end plates 21 to provide internal supporting members for brazed area 46, described in more detail below.

The area 46 between conducting lamination 21 and tab 36 is filled with a brazing material which is tapered towards the ends of shaft 14 in order to form a cantilever type support by the integral bonding of conductive lamination 21, tab 36, and extended ends of bars 44. A solid support is thus formed which further serves to prevent outward radial movement of the windings 38 when the rotor is rotated at high speeds. Furthermore, the electrical connections between alignment bars 44 and conducting laminations 21 form a plurality of amortisseur windings in the face of each pole piece, eliminating the need for separate, additional windings and associated interconnecting wiring. The rotating field coils 38 are connected to slip rings 50 which supply D. C. thereto. A suitable securing sleeve 18 holds the A. C. portion of the assembly in proper position on shaft 14.

Figure 5:
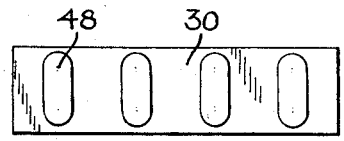
Fig. 5 is a detailed side elevation of a coil retaining plate.
Figure 6:
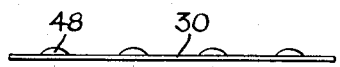
Fig. 6 is a plan view of the coil retaining plate of Fig. 5.

Abutting the sides of coil 38 and in parallel axial relationship to shaft 14 are coil retaining plates 30, Figs. 5 and 6, which are held in position by slots 26 and extended corners 28 of laminations 20. Under high speed rotating conditions, the coil windings are thus prevented from moving outwardly in a direction tangential to the direction of rotation. Each plate has dimpled or raised portions 48 to longitudinally strengthen and prevent outward bowing of retaining plate 30 which may result due to the action of centrifugal forces thereon.

Fig. 4 shows in greater detail the arrangement of the amortisseur bars 44, retaining plates 30, windings 38 and laminations 20, before the bars 44 are covered with brazing material.

In assembly, a selected number of laminations 20 are stacked on shaft 14 with copper conducting laminations 21 acting as outer faces therefor. Retaining member 32 is assembled in abutting relationship to laminations 21, insulated spacers 40 and 42 are affixed, and amortisseur bars 44 are passed through holes 24. Area 46 is next filled with a brazing compound, preferably silver solder, and then tapered by "turning" the rotor in a lathe so as to form a cantilever support. The ends of the tabs 36 are also properly trimmed to complete the cantilever organization. Coils 38 are then wound about the necks 31 of laminations 20. Lastly, side retaining plates 30 are slid into position along the sides of coils 38, and the whole unit is impregnated with a suitable compound for high voltage insulating purposes. A rotor embodying this invention will rotate at speeds as high as 20,000 R. P. M. without any resulting movement of the windings or any of the other rotor components.

Figure 7:
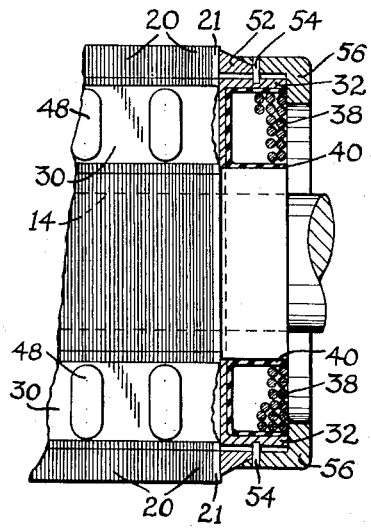
Fig. 7 is a partial sectional side elevation of the A. C. portion of the rotor illustrating a modification of the invention.

In Fig. 7 is shown a modified form of the salient pole coil retaining structure adaptable to rotors for rotation at even higher speeds. The magnetic laminations 20 are faced by a pair of conducting laminations 21 as previously described, and each lamination 21 in turn is abutted by retaining member 32, having arms 36 as heretofore. However, the brazed cantilever support member 52 is made shorter than the brazed area 46 of Fig. 1 so as to receive the matching end portions of an annular conductive retaining ring 56 which slips over the end of shaft 14 and is disposed concentrically thereabout. End ring 56 is pressed on to the brazed area 52 and fastened securely to the rotor by means of pins 54 which terminate in the arms 36 of retaining member 32. Ring 56 serves as an additional support for brazed area 52 and also provides a shortened path from one pole to another for damping current flow, thereby improving the short circuiting of amortisseur bars 44. Thus, the coil 38 is prevented from moving radially, tangentially to the direction of rotation, and further prevented from moving axially by the addition of retaining ring 56.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

We claim:

1. A high speed rotor for a dynamo electric machine comprising, a core having a plurality of axially assembled laminations forming a plurality of outwardly extending poles, each lamination having a substantially T-shaped head forming the free ends of said poles, said T-shaped heads being formed with an arcuate, exterior surface lying in the circumference of a common circle of rotation, a winding on each of said poles located beneath the under surface of each of said T-shaped heads for maintaining said windings in operative position on said core during its high speed rotation, winding support members disposed adjacent the ends of said axially assembled laminations and having laterally extending tab portions overlying said windings to provide additional support to said windings against outward movement thereof during rotation of said rotor, bars of non-magnetic conductive material axially disposed within said T-shaped heads and substantially on the outer surfaces thereof and extending longitudinally through said laminations with their free ends protruding therebeyond, and axially tapered brazements connecting said free ends of said bars and said tab portions and forming as an integral part of said T-shaped heads, arcuate, cantilever reinforcing extensions operative to coact with the under surfaces of said T-shaped heads in maintaining said windings in operative position on said rotor during its high speed rotation thereof.

2. The invention defined in claim 1 wherein each of said brazements is shaped to conform to the curvature of the outer surface of the head of said T-shaped configuration associated therewith and tapered downwardly and axially therefrom to a point where it integrally joins the outer face of said outwardly projecting tab portion.

References Cited in the file of this patent

UNITED STATES PATENTS

| | | |
|---|---|---|
| 902,065 | Field | Oct. 27, 1908 |
| 971,868 | Williamson | Oct. 4, 1910 |
| 992,548 | Dandliker | May 16, 1911 |
| 1,828,578 | Riggs | Oct. 20, 1931 |
| 1,908,158 | Mortensen | May 9, 1933 |
| 2,499,390 | Joy | Mar. 7, 1950 |
| 2,590,255 | Le Tourneau | Mar. 25, 1952 |